United States Patent

Patil

(10) Patent No.: US 9,483,367 B1
(45) Date of Patent: Nov. 1, 2016

(54) DATA RECOVERY IN DISTRIBUTED STORAGE ENVIRONMENTS

(71) Applicant: Symantec Corporation, Mountain View, CA (US)

(72) Inventor: Ram Chandra Patil, Maharashtra (IN)

(73) Assignee: Veritas Technologies LLC, Mountain View, CA (US)

( * ) Notice: Subject to any disclaimer, the term of this patent is extended or adjusted under 35 U.S.C. 154(b) by 130 days.

(21) Appl. No.: 14/317,645

(22) Filed: Jun. 27, 2014

(51) Int. Cl.
*G06F 11/00* (2006.01)
*G06F 11/14* (2006.01)
*G06F 11/07* (2006.01)

(52) U.S. Cl.
CPC ....... *G06F 11/1469* (2013.01); *G06F 11/0709* (2013.01); *G06F 11/1402* (2013.01); *G06F 11/1464* (2013.01)

(58) Field of Classification Search
CPC .......... G06F 11/1469; G06F 11/1464; G06F 11/0709; G06F 11/1402; G06F 11/1458
USPC ..................... 714/4.21, 6.2, 4.1, 4.11, 42, 43
See application file for complete search history.

(56) References Cited

U.S. PATENT DOCUMENTS

| | | | | |
|---|---|---|---|---|
| 7,831,861 B1* | 11/2010 | Greene | ............... | G06F 11/1469 707/685 |
| 8,010,829 B1* | 8/2011 | Chatterjee | ........... | G06F 11/2061 714/4.11 |
| 8,260,840 B1* | 9/2012 | Sirota | .................. | G06F 9/5061 370/216 |
| 8,266,474 B2* | 9/2012 | Goel | ..................... | G06F 11/07 709/224 |
| 8,307,239 B1* | 11/2012 | Keith, Jr. | ............ | G06F 11/1456 714/2 |
| 2006/0047997 A1* | 3/2006 | Anderson | ........... | G06F 11/1471 714/4.1 |
| 2010/0011178 A1* | 1/2010 | Feathergill | .......... | G06F 11/1466 711/162 |

* cited by examiner

*Primary Examiner* — Joseph D Manoskey
(74) *Attorney, Agent, or Firm* — Campbell Stephenson LLP

(57) ABSTRACT

Various systems and methods for determining whether a distributed storage cluster is operating with a last failure domain are disclosed. The last failure domain is the only node with access to a latest copy of configuration data and an up-to-date copy of application data. In response to a determination that the distributed storage cluster is operating with the last failure domain, the method causes the last failure domain to copy one or more changed blocks of the up-to-date copy of the application data from one or more mirrored volumes to a recovery server for storage.

20 Claims, 8 Drawing Sheets

FIG. 3A — FSS Cluster 100B

| Cluster ID 310 | Data Group ID 320 | Volume Name 330 | Recovery Flag 340 |
|---|---|---|---|
| 40911 | 605 | Vol 1 | 1 |
| 40911 | 603 | Vol 2 | 1 |
| 40911 | 400 | Vol 3 | 1 |
| 40911 | 890 | Vol 4 | 1 |
| 40911 | 890 | Vol 3 | 0 |

FIG. 3B — Recovery Server 175

| Cluster ID 310 | Data Group ID 320 | Volume Name 330 |
|---|---|---|
| 40911 | 605 | Vol 1 |
| 40911 | 603 | Vol 2 |
| 40911 | 400 | Vol 3 |
| 50233 | 400 | Vol 4 |
| 50233 | 700 | ... |
| | 603 | ... |

FIG. 3C

| B1 | B2 | B3 | B4 | B5 | B6 |
|---|---|---|---|---|---|
| B7 | B8 | B9 | B10 | B11 | B12 |
| B13 | B14 | B15 | B16 | B17 | B18 |
| B19 | B20 | B21 | B22 | B23 | B24 |
| B25 | B26 | B27 | B28 | B29 | B30 |

FIG. 3D — Changed Blocks 250

| B8 | Data |
|---|---|
| B10 | Data |
| B12 | Data |
| B21 | Data |
| B22 | Data |
| B25 | Data |
| B30 | Data |

FIG. 3E

| B1 | B2 | B3 | B4 | B5 | B6 |
|---|---|---|---|---|---|
| B7 | B8 | B9 | B10 | B11 | B12 |
| B13 | B14 | B15 | B16 | B17 | B18 |
| B19 | B20 | B21 | B22 | B23 | B24 |
| B25 | B26 | B27 | B28 | B29 | B30 |

DATA RECOVERY IN DISTRIBUTED STORAGE ENVIRONMENTS

FIELD OF THE INVENTION

This invention relates to data recovery, and more particularly, to data recovery in distributed storage environments.

DESCRIPTION OF THE RELATED ART

A cluster includes multiple interconnected computers that appear as if they are one computer to end users and applications. Each interconnected computer in the cluster is called a node. The combined processing power of multiple nodes can provide greater throughput and scalability than is available from a single node. In clustered environments, multiple nodes can share a storage device for the purpose of data storage, replication, and deduplication. A shared storage disk/device (e.g., a Cluster Shared Volume (CSV)) containing a volume (e.g., a data volume) can be made accessible for read and write operations by all nodes within a cluster. Each cluster can have multiple CSVs. However, storage is not shared in a cluster based on a shared nothing (SN) storage environment.

A Storage Area Network (SAN) is a network that includes storage devices and provides access to data storage. SANs are primarily used to enhance storage devices, such as disk arrays and are accessible to nodes such that the storage devices appear as locally attached storage devices to the nodes. However, because of distinctions between local storage devices, data storage based on a SAN-model is not without its problems. SAN storage environments can encounter problems related to the physical connectivity and access of storage devices because of the boundary between local storage, that is shared, and network storage, that is shared.

Flexible Storage Sharing (FSS) offers an alternative to certain of the problems encountered with SAN-based data storage by enabling network sharing of physical storage devices (e.g., local storage, DAS, SSD, internal storage, and the like) across a cluster. FSS can provide data redundancy, high availability, and data recovery without the need for shared storage. Utilizing fast network interconnect between nodes in the cluster, FSS allows network shared storage to co-exist with physically shared storage.

SUMMARY OF THE INVENTION

Various systems and methods for determining whether a distributed storage cluster is operating with a last failure domain are disclosed. The last failure domain is the only node with access to a latest copy of configuration data and an up-to-date copy of application data. In response to a determination that the distributed storage cluster is operating with the last failure domain, the method causes the last failure domain to copy one or more changed blocks of the up-to-date copy of the application data from one or more mirrored volumes to a recovery server for storage. In this example, the mirrored volumes are stored at a storage device associated with the last failure domain.

In one embodiment, the method causes a master node to copy the latest copy of the configuration data to the recovery server. The latest copy of the configuration data is for the plurality of nodes. The method can also determine whether the various nodes (e.g., the master node, the last failure domain, one or more failure domains, etc.) are part of the distributed storage cluster. In addition, the copying of the changed blocks of the up-to-date copy of the application data from the mirrored volumes to the recovery server for storage continues until the distributed storage cluster has more than one failure domain.

In other embodiments, each node (of the various nodes in the distributed storage cluster) is coupled to a corresponding storage devices (of various corresponding storage devices). One of more of the storage devices include the mirrored volumes, and the nodes execute an application that generates the application data.

In one example, the method includes performing a restore operation. The restore operation is performed using the latest copy of the configuration data and the changed blocks of application data stored at the recovery server and is performed on the nodes after one or more nodes rejoin the distributed storage cluster. After performing the restore operation, the method deletes the latest copy of the configuration data and the changed blocks of application data from the recovery server.

In some embodiments, the method determines whether the distributed storage cluster is operating under the last failure domain which includes determining whether all nodes of the other than the last failure domain have failed, determining whether the storage device coupled to each node has failed, and determining whether one or more nodes that rejoin the distributed storage cluster are performing a synchronization operation.

In one embodiment, the storage device associated with the master node includes the up-to-date copy of the application data and the master node and the storage device associated with the master node include the latest copy of the configuration data. In this example, the master node is the last failure domain, the master node comprises one part of the latest copy of the configuration data, and the storage device comprises an another part of the latest copy of the configuration data.

However, in other embodiments, it is not mandatory that the master node should have storage connectivity. A node without storage connectivity can be the master node and the latest copy of the configuration data can be accessed over a network by using the last failure domain.

In other embodiments, the distributed storage cluster maintains a failure count ID that indicates whether the restore operation should be performed from the recovery server, or whether the master node comprises the latest copy of the configuration data and the up-to-date copy of the application data.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 3A is a table illustrating details of how application data is stored in a FSS cluster, according to one embodiment of the present invention.

FIG. 3B is a table illustrating details of how application data is stored on a recovery server, according to one embodiment of the present invention.

FIG. 3C is a table illustrating changed blocks of application data in a FSS cluster, according to one embodiment of the present invention.

FIG. 3D is a table illustrating changed blocks of application data logged on a recovery server, according to one embodiment of the present invention.

FIG. 3E is a table illustrating how changed blocks of application data are synchronized during a restore operation, according to one embodiment of the present invention.

Figure 1A:
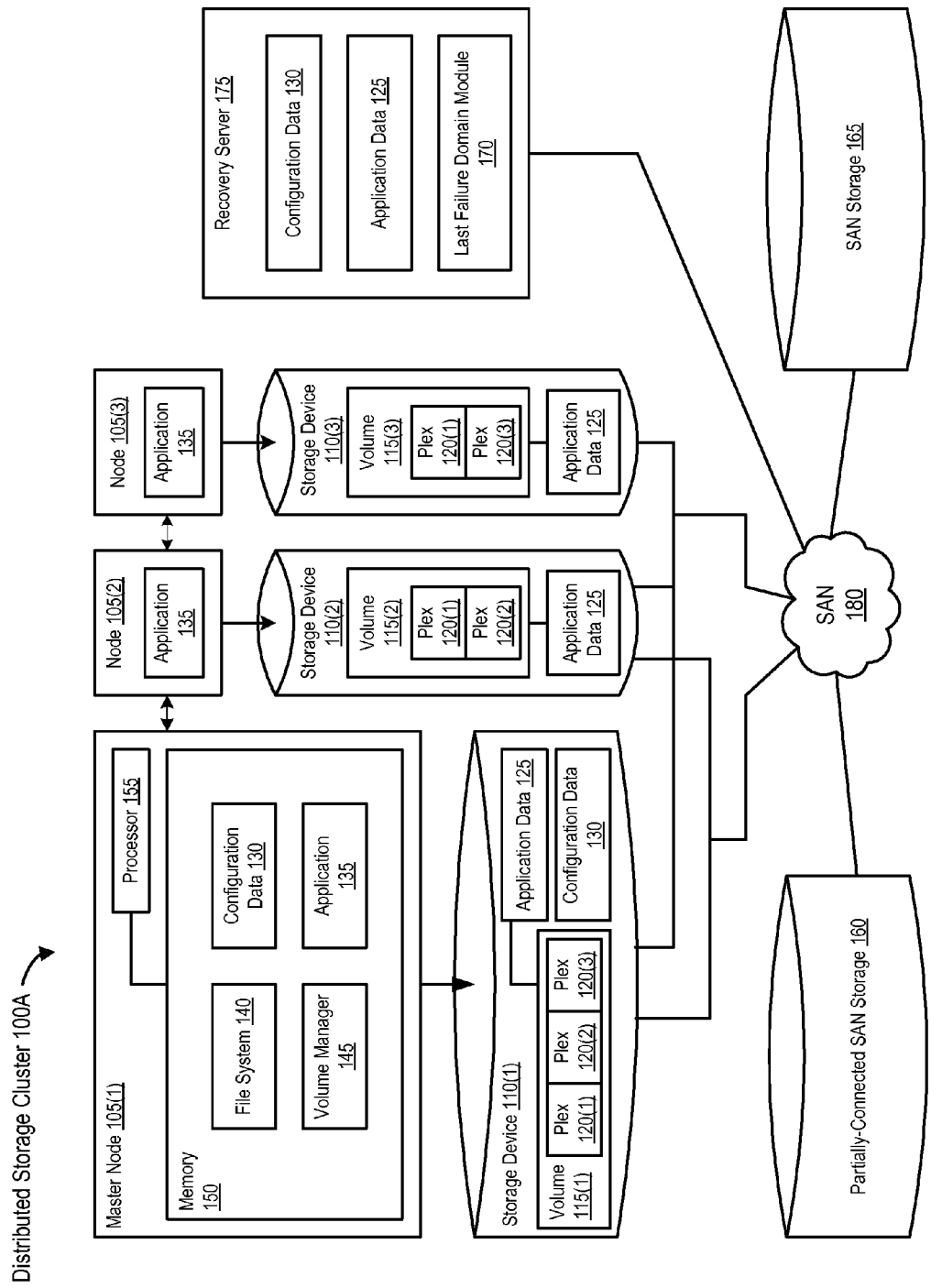
FIG. 1A is a block diagram of a distributed storage cluster, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention as defined by the appended claims.

DETAILED DESCRIPTION

Introduction

FSS systems suffer from certain shortcomings. Logical volumes can be created out of network shared storage as well as physically shared storage to provide a SN storage environment. A SN storage environment is a distributed storage environment in which each node in a cluster is independent and self-sufficient. None of the nodes in the cluster share disk storage. However, in a SN storage environment, if a physical storage device fails or is removed, or if a node contributing physical storage to a volume fails and must be rebooted, the distributed storage environment can become dependent on a last failure domain. If the last failure domain or the physical storage device attached to the last failure domain fails for any reason, an application executing on the nodes in the cluster cannot be served.

In a clustered environment, storage is distributed and shared between multiple nodes (e.g., computer systems). In a Flexible Storage Sharing (FSS) cluster, which is a type of distributed storage cluster, multiple nodes in a cluster can share one or more Clustered Shared Volumes (CSVs). FSS enables cluster wide network sharing of local storage. Local storage can be in the form of Direct Attached Storage (DAS), Sold-State Drive (SSD), or internal disk drives. The network sharing of storage is enabled through the use of network interconnect among the nodes of the cluster. FSS allows network shared storage to co-exist with physically shared storage. VERITAS Storage Foundation®, available from Symantec Corporation of Mountain View, Calif., provides FSS as part of Storage Foundation™ Cluster File System.

Sharing storage (e.g., by implementing a CSV) simplifies storage management by allowing large numbers of nodes (e.g., computers, servers, virtual machines, etc.) to access a common shared disk or set of such disks. Nodes in a cluster coordinate metadata I/O operations to the shared storage via an application-layer network protocol (e.g., Server Message Block (SMB) protocol, Common Internet File System (CIFS), etc.). Read/write operations from the various nodes in the cluster can be passed directly to the shared storage (e.g., Serial attached Small Computer System Interface (SCSI), iSCSI, Fibre Channel, Fibre Channel over Ethernet, etc.) via the aforementioned block-based protocols.

FIG. 1A is a block diagram of a distributed storage cluster. Distributed storage cluster 100A includes a computing system for performing data storage and recovery in distributed storage environments. The computing system includes a master node 105(1), and nodes 105(2) and 105(3). Master node 105(1) is coupled to storage device 110(1) and nodes 105(2) and 105(3) are coupled to storage devices 110(2) and 110(3) respectively. Distributed storage cluster 100A includes a cluster of nodes, which in turn includes master node 105(1), node 105(2), and node 105(3). In this example, master node 105(1) includes a processor 155 and a memory 150. Memory 150 stores configuration data 130, file system 140, and volume manager 145, and runs application 135. Similarly, nodes 105(2) and 105(3) also run application 135 and can also store configuration data, a file system and a volume manager (not shown). Master node 105(1) and nodes 105(2) and 105(3) can each be any of a variety of different types of computing devices, including a server, personal computing device, laptop computer, netbook, personal digital assistant, tablet computer, or the like.

Master node 105(1), and nodes 105(2) and 105(3) are each individually and independently coupled to storage devices 110(1), 110(2), and 110(3) respectively. Storage devices 110(1), 110(2), and 110(3) can include one or more of a variety of different storage devices, including hard disks, compact discs, digital versatile discs, solid-state drive (SSD) memory such as Flash memory, and the like, or one or more logical storage devices such as volumes implemented on one or more such physical storage devices.

Master node 105(1) and all or part of storage device 110(1) can be integrated (e.g., where the storage device is coupled to the master node's internal processing devices by an internal bus and is built within the same chassis as the rest of the primary node) or separate. If separate, master node 105(1) and storage device 110(1) can be coupled by a local connection (e.g., using a technology such as Bluetooth™, Peripheral Component Interconnect (PCI), Small Computer System Interface (SCSI), or the like) or via one or more networks such as the Internet, a local area network (LAN), or a storage area network (SAN). A similar configuration can be implemented for node 105(2) and storage device 110(2) and node 105(3) and storage device 110(3).

Storage device 110(1) stores application data 125 and configuration data 130. Storage device 110(1) includes volume 115(1) which in turns includes three plexes—120(1), 120(2), and 120(3). Storage device 110(2) includes volume 115(2) which in turns includes two plexes—120(1) and 120(2). Storage device 110(3) includes volume 115(3) which in turns includes three plexes—120(1) and 120(3). In a distributed storage environment, volumes 115(1), 115(2), and 115(3) can be referred to as mirrored volumes because they each mirror physical storage from more than one storage device.

A plex, as the term is used herein, identifies the storage device from which physical storage is contributed to a mirrored volume. For example, volume 115(1) of storage device 110(1) has three plexes—120(1), 120(2), and 120(3). Plex 120(1) refers to physical storage contributed from storage device 110(1), plex 120(2) refers to physical storage contributed from storage device 110(2), and plex 120(3) refers to physical storage contributed from storage device 110(3). Therefore, in this example, volume 115(1), which is a mirrored volume, is being provided physical storage from all three storage devices 110(1), 110(2), and 110(3) of distributed storage cluster 100A.

Distributed storage cluster 100A also includes recovery server 175 which is coupled to nodes 105(1), 105(2), and 105(3) via a Storage Area Network (SAN). Recovery server 175 will be discussed in greater detail with respect to FIGS. 1B, 2C, and 3A-3E. In this example, SAN 180 also couples a partially-connected SAN storage and a SAN storage to the distributed storage cluster. Therefore, a SAN environment can be simulated by directly coupling a storage device to a node (e.g., storage device 110(1) to master node 105(1)) and using both partially-connected SAN storage and SAN storage to create the distributed storage environment. In this manner, network shared storage (e.g., partially-connected SAN storage 160 and SAN storage 165) can co-exist with physically shared storage (storage devices 110(1), 110(2), and 110(3)). However, it should be noted that a FSS cluster does not require SAN or network shared storage.

Figure 1B:
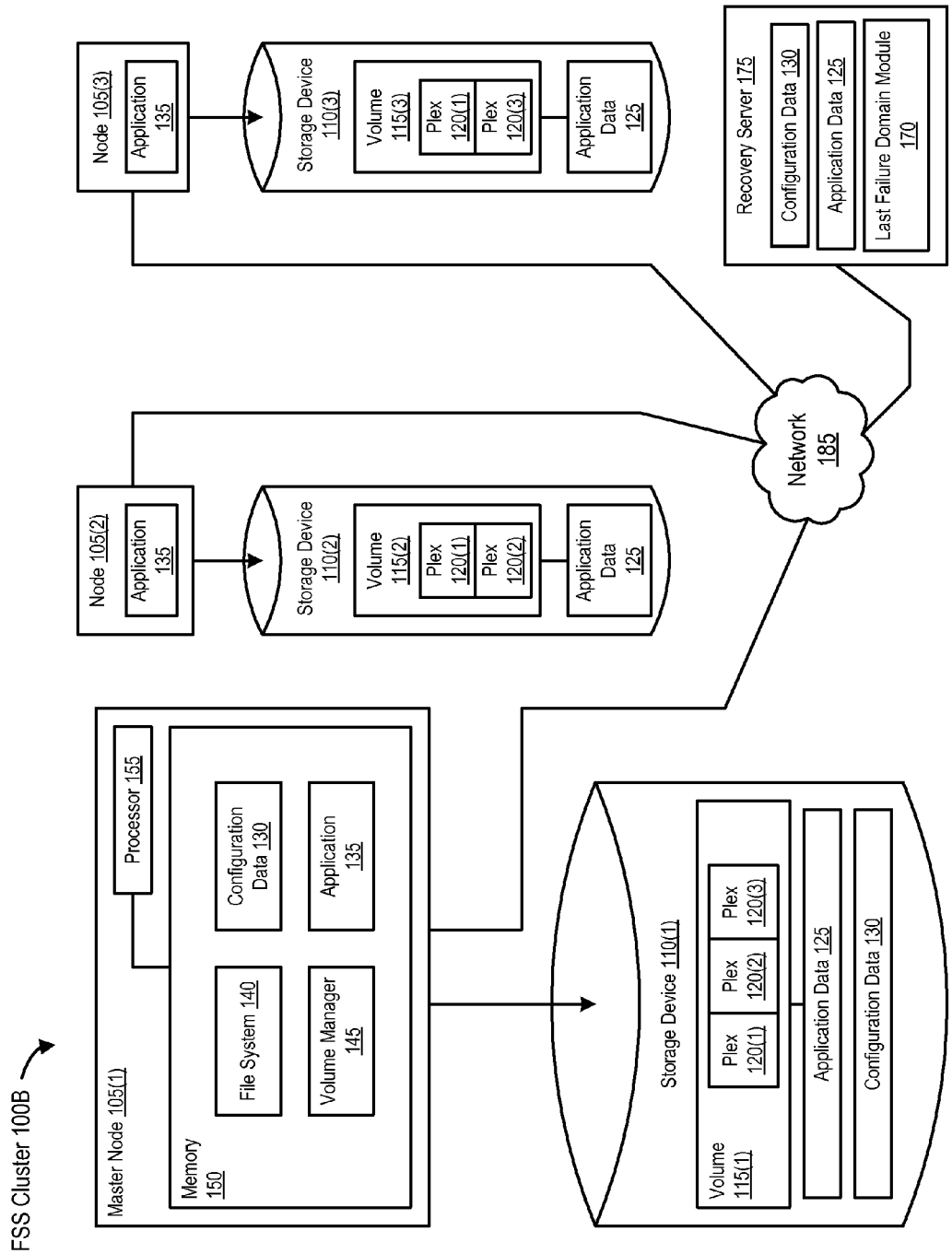
FIG. 1B is a block diagram of a Flexible Storage Sharing (FSS) cluster, according to one embodiment of the present invention.

FIG. 1B is a block diagram of a FSS cluster. FSS cluster 100B includes a computing system for performing data storage and recovery in shared nothing storage environments. FSS cluster 100B includes recovery server 175. A recovery server is a computing device that performs data storage and recovery operations in a distributed storage environment. In this example, recovery server 175 stores configuration data 130 and application data 125. Recovery server 175 also implements a last failure domain module 170 and is coupled to master node 105(1), and nodes 105(2) and 105(3).

Configuration data is data that is used by a Cluster Volume Manager (CVM) (e.g., volume manager 145) for configuring the various nodes in a FSS cluster. As shown in FIG. 1B, master node 105(1) is a configuration master node for logical volume management, and nodes 105(2) and 105(3) are slaves. Configuration data 130 includes data to maintain the configuration of mirrored volumes (e.g., volumes 115(1), 115(2), and 115(3)). For example, configuration data can track and log changes to mirrored volumes by updating an operating system at the kernel level. In the example of FIG. 1B, the latest copy of configuration data 130 applicable to FSS cluster 100B is available in the kernel of master node 105(1) as well as on storage device 110(1). However, it should be noted that should master node 105(1) fail, node 105(2) or node 105(3) can take over the role of the master node.

In some embodiments, CVM maintains configuration data 130 in at least three locations in FSS cluster 100B: in a kernel of master node 105(1), in a configuration daemon of CVM, and on a storage device of a node in the cluster (not shown in FIG. 1B). In this example, all changes made to configuration data 130 can be captured to ensure that all three copies of configuration data 130 are consistent. For example, a change to configuration data 130 can include the creation of a new data object, deletion of an existing data object, or a state change of a data object. In one embodiment, if a node does not have access to a storage device, the latest copy of the configuration data can be accessed by that node over a network (e.g., network 185).

Application data 125 is a set of data that is maintained by application 135 (e.g., a database application, not shown in FIG. 1B). Application data 125 is generated by application 135 executing on nodes in FSS cluster 100B. As shown in FIG. 1B, application 135 executes on all the nodes in FSS cluster 100B and generates application data 125, which is stored in volumes 115(1), 115(2), and 115(3) of storage devices 110(1), 110(2), and 110(3) coupled to master node 105(1), and nodes 105(2) and 105(3) respectively. For example, application data can be generated by a write operation. A write operation, or more simply, a write or an application write, is any application I/O operation that causes modifications to the application's data (e.g., creation, deletion, etc.). All nodes that are part of FSS cluster 100B generate application data (e.g., writes from application 135, which can be executing on one or more nodes in the FSS cluster). It should also be noted that, all nodes that are part of FSS cluster 100B can write application data to all storage devices that are part of FSS cluster 100B.

In this example, master node 105(1) implements a file system 140. File system 140 is a software program that organizes and controls access to files. Here, file system 140 controls access to the files used by application 135 stored on storage device 110(1). The term "file system" can refer to both the software (which itself can be part of an operating system) that organizes the files and the collection of files that are organized thereby. Files can be organized hierarchically, with directories collecting groups of files and/or other directories. A file system application like file system 140 can provide applications, such as a database application, with access to files (e.g., to open, read, modify, create, delete, and otherwise interact with the data within the files).

A file system also tracks how the files the file system organizes map to the blocks of data within the underlying volume. This way, when an application requests access to a particular file (e.g., using the file name of the file), the file system can translate that request into a request for the particular blocks of data included in the requested file. Accordingly, the file system maintains information regarding blocks of data in storage devices 110(1), 110(2), and 110(3) belong to each file.

Each block is a unit of data. In some embodiments, blocks are fixed-size units of data that represent the smallest granularity of data that can be manipulated by the file system, underlying persistent storage device, and/or operating system. In other embodiments, blocks can be variably-sized, can represent a larger granularity than the smallest representable by the file system, and/or have other, different characteristics than described herein.

Recovery server 175 also implements a last failure domain module 170. In one embodiment, last failure domain module 170 determines whether distributed storage cluster 100A is operating with a last failure domain. If distributed storage cluster 100A is operating with a last failure domain, last failure domain module 170 causes the last failure domain to copy one or more changed blocks of an up-to-date copy of application data from one or more mirrored volumes to recovery server 175 for storage.

Further, while connections between application 135, recovery server 175, and storage device 110(1) are shown in relation to master node 105(1), these connections are for illustration purposes only and other connection configurations are possible. For example, one or more of application 135 and storage device 110(1) may be physically outside but coupled to the node represented by master node 105(1). An example of a commercially available CVM is VERITAS Volume Manager®, available from Symantec Corporation of Mountain View, Calif.

Failure Domains in a FSS Cluster

In a distributed storage cluster (as shown in FIG. 1A) or in a FSS cluster (as shown in FIG. 1B), physical storage is shared and originates from several nodes in the cluster. For example, in FIG. 1B, storage device 110(1), which has a volume (e.g., volume 115(1)), includes storage from all three storage devices—110(1), 110(2), and 110(3). In this example, volume 115(1) is created from physical storage from storage device 110(1) as well as from two mirrored volumes of physical storage from storage devices 110(2) and 110(3) which are illustrated as plex 120(2) and 120(3) respectively.

When application 135 generates application data 125 (e.g., through a write operation), the I/O generated by application 135 is stored in all three volumes 115(1), 115(2), and 115(3). Because a FSS cluster shares physical storage by creating mirrored volumes, critical data can be protected if one or more storage devices fail for any reason. For example, if storage device 110(3) fails or goes offline, application 135 can still be served by storage devices 110(1) and 110(2), which both have an up-to-date copy of application data 125. Therefore, in the case of a failure of node 105(3) or storage device 110(3), master node 105(1) and node 105(2) act as failure domains.

A failure domain, in at least certain embodiments, is any node (e.g., computer system) which has access to the latest copy of configuration data used by all the nodes in the FSS cluster as well as an up-to-date copy of application data generated by the application executing on the nodes in the FSS cluster. Because a distributed storage or FSS cluster shares physical storage from various storage devices by creating mirrored volumes, failure of a node or a storage device coupled to a node (which contributes physical storage to the FSS cluster) can have catastrophic consequences because the physical storage the failed storage device (or a storage device coupled to a failed node) contributes to the mirrored volumes is no longer available. In this scenario, the FSS cluster is dependent on the surviving node(s) (or failure domain(s)) to serve the application. Similar consequences can result if a node goes offline, or is rebooted for some reason.

For example, in the three-node FSS cluster shown in FIG. 1B, if node 105(2) fails and/or has to be rebooted for any reason, or if storage device 110(2) fails, FSS cluster 100B is left with two failure domains—master node 105(1) and node 105(3). The physical storage being contributed by storage device 110(2) (e.g., plex 120(2)) is also not available because storage device 110(2), which is directly coupled to node 105(2), has failed, or node 105(2) itself has failed or is offline.

If and when node 105(2) does rejoin FSS cluster 100B, node 105(2) will not have an up-to-date copy of application data 125 to serve application 135 because application 135 may generate additional application data while node 105(2) is offline. Therefore, node 105(2) has to synchronize application data from healthy nodes (e.g., either master node 105(1) or node 105(3)) to revert back to a healthy state where node 105(2) has an up-to-date copy of application data 125 to serve application 135. The difference in changed blocks of data from the time of failure of node 105(2) to the time the synchronization of node 105(2) is complete can be significant.

A Shared Nothing Storage Environment in a FSS Cluster

As discussed above, a FSS cluster is a type of distributed storage cluster. To mitigate problems SAN storage environments can encounter related to the physical connectivity and access of storage devices because of the boundary between physically shared storage and network shared storage, and due to the lack of easy scalability, FSS clusters can be used to implement a shared nothing (SN) storage environment. A SN storage environment is a distributed computing architecture in which each node in the FSS cluster is independent and self-sufficient. There is no single point of contention across the system. More specifically, none of the nodes share memory or disk storage.

FSS cluster 100B can be implemented as a SN cluster. For example, as illustrated in FIG. 1B, master node 105(1), and nodes 105(2) and 105(3) are not actually sharing disk storage. But yet, these nodes behave as a single entity because they emulate storage sharing via mirrored volumes. In one embodiment, network interconnect between master node 105(1), and nodes 105(2) and 105(3) (e.g., Ethernet or Infiniband provided by network 185) can be used to share configuration data (for FSS cluster 100B) as well as application data. For example, a switched Ethernet or Infiniband fabric can be used to allow direct communication between master node 105(1), and nodes 105(2) and 105(3). In order to maintain resiliency in case of node or storage device failure, each node in FSS cluster 100B replicates the local node storage across two or more nodes and then re-balances the copies of data dynamically as nodes join or leave FSS cluster 100B. For example, local node storage of storage device 110(1) (illustrated as plex 120(1) in FIG. 1B) is replicated across two or more nodes, nodes 105(2) and 105(3), and illustrated as plexes 120(2) and 120(3) respectively.

However, because the actual storage devices in the SN storage environment described above are not shared (e.g., storage devices 110(1), 110(2) and 110(3) are exclusive to master nodes 105(1), and nodes 105(2) and 105(3) respectively), FSS cluster 100B is dependent on one or more failure domains to serve application 135. If nodes 105(2) and 105(3) fail, if storage devices 110(2) and 110(3) fail, if node 105(2) and storage device 110(3) fails, or if node 105(3) and storage device 110(2) fails, then FSS cluster 100B will be in a jeopardy state and will operate with a last failure domain.

Last Failure Domain in a Shared Nothing FSS Cluster

A last failure domain includes the only node in a distributed storage cluster (e.g., FSS cluster 100B) with access to an up-to-date copy of application data and a latest copy of configuration data. In one embodiment, a distributed storage cluster (e.g., FSS cluster 100B) is in a jeopardy state if the distributed storage cluster operates with the last failure domain. Therefore, if a distributed storage cluster is operating with a last failure domain, an up-to-date copy of application data and a latest copy of configuration data needs to be stored for data backup and recovery purposes. For example, if a failed node rejoins the distributed storage cluster, the failed node can use the stored copies of the application data and the configuration data for synchronization purposes and once healthy, can eliminate the jeopardy state of the distributed storage cluster. Because the recovery server stores changed blocks of application data, in one embodiment, a node which fails and has to be rebooted can use application data stored on the recovery server to synchronize lost data (e.g., changed blocks of data due to application writes generated in the time during which the node was offline, rebooting, and synchronizing itself).

Figure 2A:
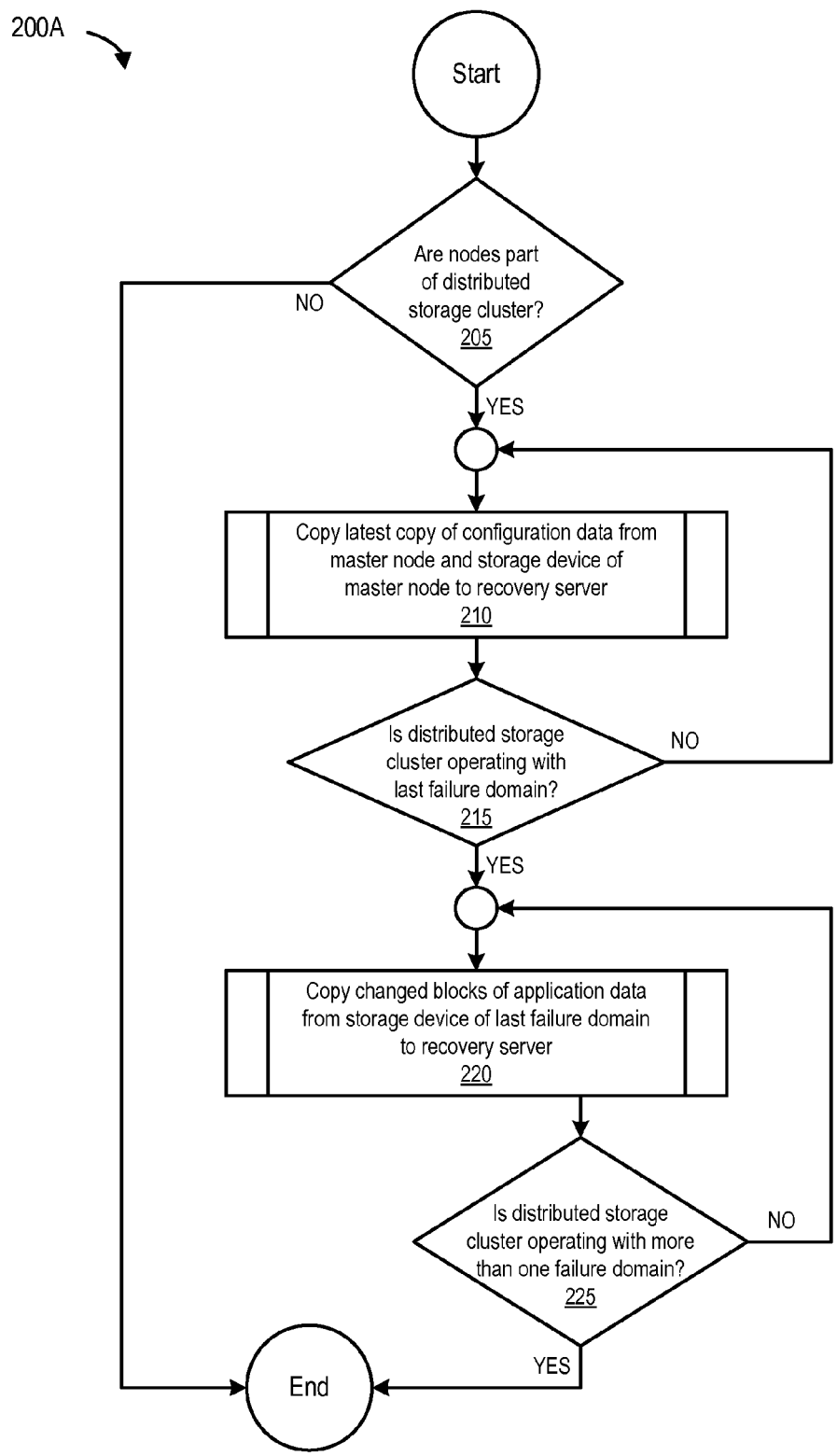
FIG. 2A is a flowchart of a data storage method if a distributed storage cluster is operating with a last failure domain, according to one embodiment of the present invention.

FIG. 2A is a flowchart of a data storage method if a distributed storage cluster is operating with a last failure domain. The method begins at 205 by determining if the nodes in the cluster are part of a distributed storage cluster. For example, as illustrated in FIG. 1B, master node 105(1), and nodes 105(2) and 105(3) are part of FSS cluster 100B, which is a distributed shared nothing storage cluster. In one embodiment, last failure domain module 170 determines whether one or more nodes are part of a distributed storage cluster. If nodes are part of a distributed storage cluster, and as shown at 210, last failure domain module 170 causes a master node to copy a latest copy of configuration data from the master node and the storage device coupled to the master mode to a recovery server. For example, last failure domain module 170, which is part of recovery server 175, causes master node 105(1) to copy configuration data 130 from master node 105(1) and configuration data from storage device 110(1) to recovery server 175.

In some embodiments, the CVM in FSS cluster 100B (e.g., volume manager 145) provides logical volume manager capabilities to FSS cluster 100B. In this example, master node 105(1) handles all shared disk group configuration changes, which is stored as configuration data 130 on master node 105(1) and storage device 110(1). All commands related to configuration changes are sent to master node 105(1). In another embodiment, the role of master node 105(1) can fail over or change to another node in the cluster if master node 105(1) crashes, fails, or has to be rebooted for any reason. For example, if master node 105(1) fails and leaves FSS cluster 100B, node 105(2) or node 105(3) can step in and assume the role of master node 105(1). In this manner, any node on FSS cluster 100B has the ability to switch into the role of master node 105(1). In addition, because all nodes on FSS cluster 100B can write application data 125 to all storage devices associated with FSS cluster 100B (e.g., storage devices 110(1), 110(2), and 110(3)), in one embodiment, the role of a master node can be switched based on the availability and/or system resources of master node 105(1).

The method of FIG. 2A continues at 215 by determining whether the distributed storage cluster (e.g., distributed storage cluster 100A) is operating with the last failure domain. As an embodiment, the last failure domain includes the only node in a distributed storage cluster (e.g., FSS cluster 100B) with access to an up-to-date copy of application data and a latest copy of configuration data. If the distributed storage cluster (e.g., FSS cluster 100B) is operating with the last failure domain, at 220, last failure domain module 170 copies changed blocks of application data from the storage device associated with the last failure domain to the recovery server. For example, if nodes 105(2) and 105(3) fail, if storage devices 110(2) and 110(3) fail, if node 105(2) and storage device 110(3) fails, or if node 105(3) and storage device 110(2) fails, FSS cluster 100B will be operating with a last failure domain, which in this instance, is master node 105(1). In this example, last failure domain module 170 will copy (or cause master node 105(1) to copy) changed blocks of application data 125 from volume 115(1) of storage device 110(1) to recovery server 175.

The method ends at 225 by determining whether the distributed storage cluster is operating with more than one failure domain. If the distributed storage cluster is operating with more than one failure domain, then presumably, either node 105(2) and 105(3) has rejoined FSS cluster 100B and is in a healthy state (e.g., has an up-to-date copy of application data 125 and can serve application 135). The existence of more than one failure domain can mean that the cluster is not in a jeopardy state. Therefore, in one embodiment, the copying of 220 continues until the distributed storage cluster has more than one failure domain.

Last failure domain module 170 can determine whether the distributed storage cluster is operating with the last failure domain upon the occurrence of several scenarios. The determination can include determining whether all nodes of the distributed storage cluster other than a last node have failed. The last remaining node that is capable of serving the application executing on the various nodes in the cluster is the last failure domain. The determination can also include determining whether the storage devices coupled to the nodes in the cluster have failed leaving the cluster with just one storage device and one node to serve the application. In addition, the determination can also include determining whether one or more nodes that rejoin the cluster are performing a synchronization operation (and are thus unavailable to serve the application with an up-to-date copy of application data).

As discussed above, a node that fails (and, e.g., has to be rebooted) can, at some point in the future, rejoin the distributed storage cluster. However, when the failed node rejoins the distributed storage cluster, the storage device coupled to that node does not have the latest copy of configuration data or an up-to-date copy of application data. However, from an application perspective, the rejoined node appears to be in a healthy state because the rejoined node is capable of executing the application and writing newly generated application data to one or more storage devices. However, from a CVM perspective, the rejoined node does not have the up-to-date copy of application data because of new application data that is generated in the time during which the rejoined node was offline. Therefore, in at least certain embodiments, unless and until the rejoined node performs a synchronization operation (e.g., either from the recovery server or from another healthy node), the rejoined node cannot serve the application due to the missing data.

Therefore, in one embodiment, the latest copy of configuration data 130 and an up-to-date copy of application data 125 is stored in recovery server 175. Parts of the latest copy of the configuration data can be located in a kernel of the last failure domain and other parts of the latest copy of the configuration data can be located on the storage device associated with the last failure domain. Although application data is available from all storage devices coupled to all nodes executing the application (e.g., all failure domains), in the case of the last failure domain, the up-to-date copy of application data is available from the storage device associated with the last failure domain.

It should be noted that copying application data to the recovery server only happens if the distributed storage cluster is operating with a last failure domain. In addition to the scenarios described above, an administrator may determine that the distributed storage cluster is operating with a last failure domain. In one embodiment, even if there are two failure domains in the distributed storage cluster, an administrator may determine that the distributed storage cluster is operating with a last failure domain because one of the failure domains may be experiencing network interconnection difficulties.

In another embodiment, a determination that the distributed storage cluster is operating under the last failure domain may be made based on the history of node failures in the distributed storage cluster. For example, if FSS cluster 100B has two failure domains (e.g., master node 105(1) and node 105(2)), either of which can serve application 135, FSS cluster can still be treated as operating under a last failure domain, for example, if node 105(2) has a history of failures and requires constant rebooting. In this example, a last failure domain situation can be declared based on the inevitability that the distributed storage cluster will be left operating with a last failure domain based on the operating conditions and/or history of operating failures of the nodes in the distributed storage cluster.

It should also be noted that determining whether a distributed storage cluster is operating with a last failure domain is based on the operating condition of both the node executing the application, as well as the storage device coupled to the node that stores application data generated by the application. In this embodiment, the determination of whether the distributed storage cluster is operating with a last failure domain is not determined based on a single point of failure, but rather, is determined based on an amalgamation of failed operating conditions of nodes and/or storage devices that make up the distributed storage cluster.

For example, in reference to FIG. 1B, any combination of failures, such as the following, can result in the determination that FSS cluster 100B is operating with a last failure domain (e.g., master node 105(1) and storage device 110(1)): nodes 105(2) and 105(3), storage devices 110(2) and 110(3), node 105(2) and storage device 110(3), or node 105(3) and storage device 110(2). Therefore, in one or more embodiments, a combination of a failure of a storage device and a node that leaves a single node-storage device combination in the distributed storage cluster that can serve an application and has access to a latest copy of configuration data and an up-to-date copy of application data can result in the determination that the distributed storage cluster is operating with a last failure domain.

Figure 2B:
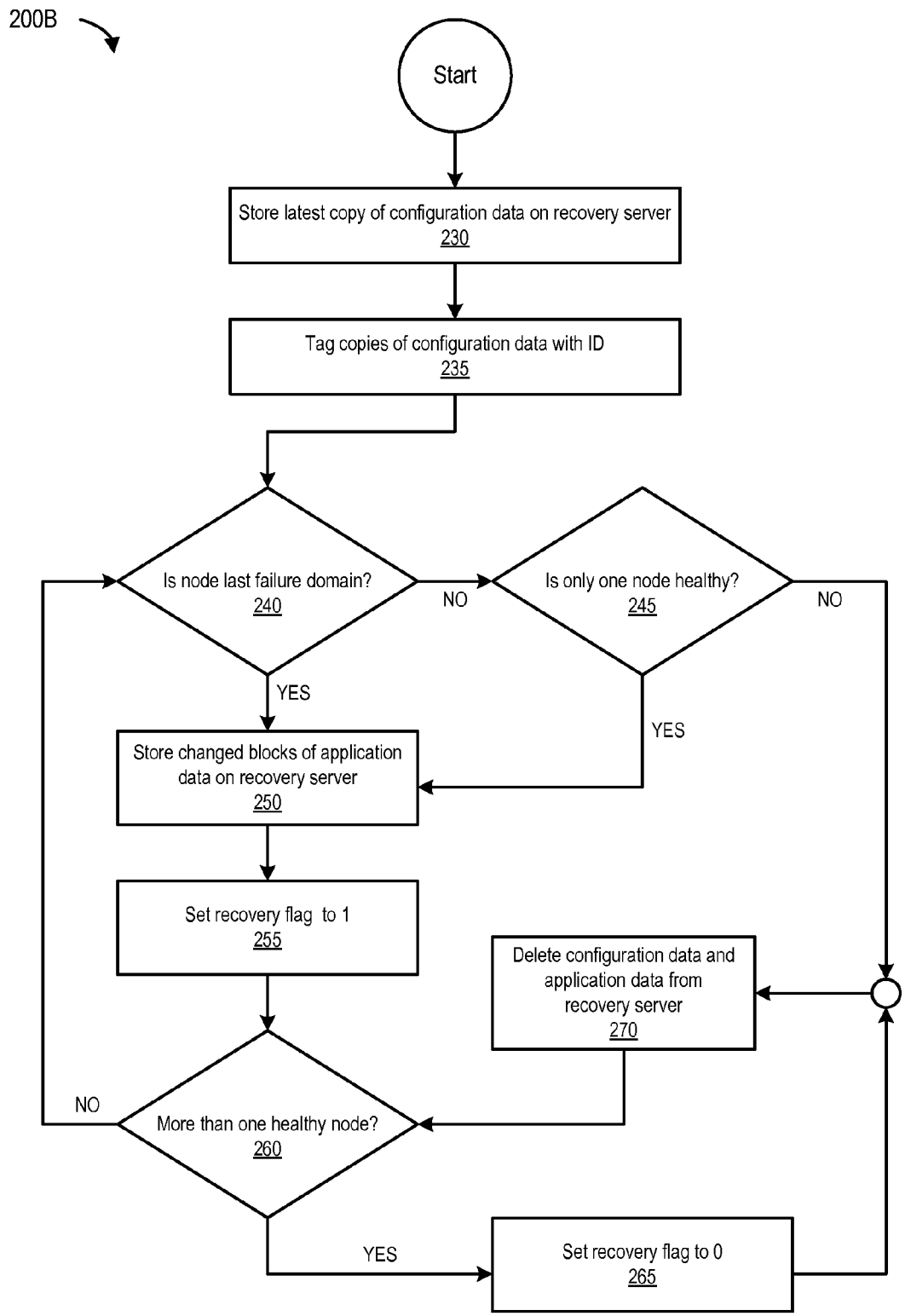
FIG. 2B is a flowchart of a method of storing configuration data and application data on a recovery server, according to one embodiment of the present invention.

FIG. 2B is a flowchart of a method of storing configuration data and application data on a recovery server. The method begins at 230 by storing the latest copy of configuration data 130 on recovery server 175. At 235, the copy of configuration data 130 stored on recovery server 175 is tagged with an identification tag (ID) (e.g., a recovery flag). At 240, a determination is made whether a node in the distributed storage cluster is a last failure domain. If the node is the last failure domain, or as determined in 245, if only one node is healthy, the method at 250, stores changed blocks of application data on recovery server 175, and at 355, sets the recovery flag (e.g., to 1).

In some embodiments, changed blocks of application data refers to writes generated by the application between the time after the determination is made that the distributed storage cluster is operating with the last failure domain, and until the time the distributed storage cluster has more than one failure domain. In one embodiment, a recovery flag indicates whether changed blocks of application data need to be copied from the last failure domain to the recovery server. At 255, the value of a recovery flag that is set (e.g., to 1) and indicates that the distributed storage cluster is operating with a last failure domain, and also indicates to last failure domain module 170 that changed blocks of application data must be copied to recovery server 175 until the distributed storage cluster is operating with more than one failure domain (e.g., by the rejoining and synchronization of another node to create more than one healthy node/failure domain in the distributed storage cluster).

At 260, if there is more than one healthy node in the distributed storage cluster (e.g., two or more failure domains), the value of the recovery flag is set to 0, and at 265, configuration data 130 and application data 125 is deleted from recovery server 175. If there is more than one failure domain, any node that fails and has to be rebooted can synchronize missing data from the healthy nodes and the distributed storage cluster is not in a jeopardy state. Therefore, to prepare for the next determination that the distributed storage cluster is operating with a last failure domain, previously stored copies of configuration data and application data have to be deleted from the recovery server.

Role of the Recovery Server

A recovery server is a computing device that stores a latest copy of configuration data and an up-to-date copy of application data for data storage and recovery purposes. Recovery server 175 performs data recovery at the volume level. In one embodiment, recovery server 175 is coupled to master node 105(1), and nodes 105(2) and 105(3) through network 185 which implements the same fast network interconnect technology that is used for data communication between master node 105(1), node 105(2), and node 105(3). Therefore, if a last failure domain also fails in a distributed storage cluster, recovery server 175 can be used to serve application 135 once one or more nodes rejoin the distributed storage cluster (e.g., upon rebooting) without waiting for the nodes to first synchronize missing data.

Figure 2C:
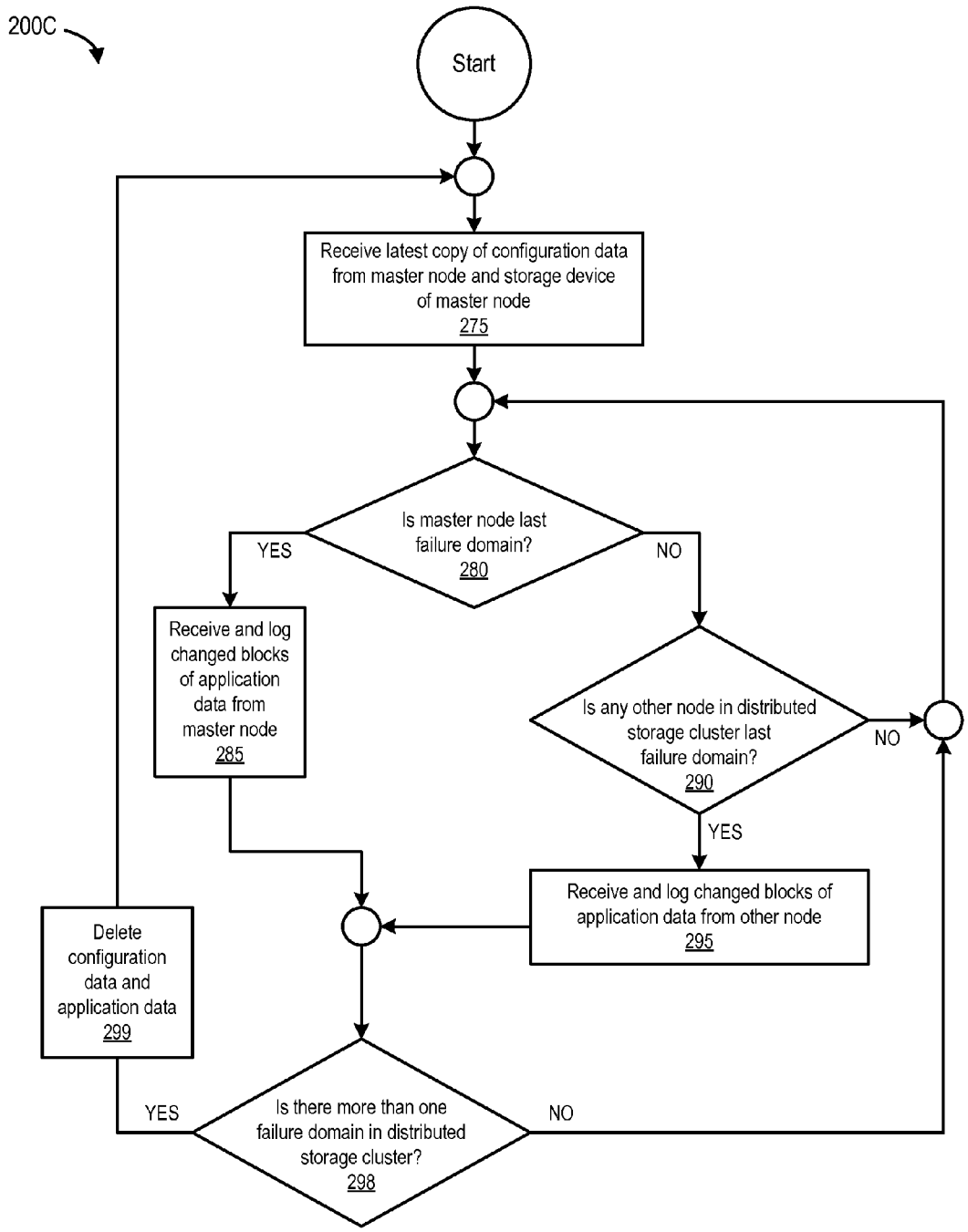
FIG. 2C is a flowchart of a method of receiving configuration data and application data at a recovery server, according to one embodiment of the present invention.

FIG. 2C is a flowchart of a method of receiving configuration data and application data at a recovery server. The method begins at 275 by receiving the latest copy of configuration data 130 from master node 105(1) and storage device 110(1). At 280, the method determines if master node 105(1) is the last failure domain. If master node 105(1) is the last failure domain, recovery server 175, at 285, receives and logs changed blocks of application data 125 from master node 105(1), and if master node 105(1) is not the last failure domain, the method, at 290 determines if any other node in the distributed storage cluster is the last failure domain. If there is another node other than the master node that is the last failure domain, recovery server 175, at 295, receives and logs changed blocks of application 125 from the node that is the last failure domain. At 298, the method determines if the distributed storage cluster has more than one failure domain. If the distributed storage cluster has more than one failure domain, the method, at 299, deletes configuration data 130 and application 125 from recovery server 175.

In one or more embodiments, recovery server 175 can be used to perform (or facilitate) a restore operation. The restore operation can be performed using the latest copy of configuration data 130 and the changed blocks of application data 125 stored on recovery server 175. In this example, the restore operation is performed on one or more nodes of FSS cluster 100B after one or more nodes rejoin FSS cluster 100B. If the distributed storage cluster has two or more failure domains, the restore operation has to be performed from one of the existing failure domains. This is because changed blocks of application data are not sent to the recovery server for storage unless a determination is made that the distributed storage cluster is operating with a last failure domain, which, by definition, means that there is only one failure domain serving the distributed storage cluster and the application.

In one embodiment, if the distributed storage cluster is operating with a last failure domain, the restore operation can be performed from the recovery server. For example, if master node 105(1) of FIG. 1B is the last failure domain, and if node 105(2) exists (e.g., by rebooting) and rejoins FSS cluster 100B, then recovery server 175 can be used to perform a restore operation for node 105(2). Node 105(2) can be synchronized with the latest copy of configuration data as well as the up-to-date copy of application data which is stored on recovery server 175 after the determination is made that FSS cluster 100B is operating with a last failure domain. In another embodiment, node 105(2) can also be synchronized with the latest copy of configuration data as well as the up-to-date copy of application data from master node 105(1), which, because node 105(2) is the last failure domain, has access to the latest copy of configuration data as well as the up-to-date copy of application data. Therefore, in a restore operation in which the distributed storage cluster is operating with a last failure domain, a restore operation can be performed from either the recovery server or from the node that is the last failure domain. However, the restore operation may be performed exclusively from the recovery server to allow the last failure domain to serve the application executing on the various nodes in the distributed storage cluster without affecting system performance.

In one embodiment, if the distributed storage cluster is operating with a last failure domain, an application write generated by the node that is the last failure domain is first written to the recovery server before the application write is written to the storage device coupled to the node that is the last failure domain. Once an acknowledgement from the recovery server is received that the application write has been stored, then the last failure domain writes the same application write to the storage device. For example, if master node 105(1) is the last failure domain, then a write generated by application 135 executing on master node 105(1) is first sent to recovery server 175 for storage. The application write is then written to volume 115(1) on storage device 110(1) only after an acknowledgement is received from recovery server 175 that the application write has been successfully stored. Therefore, if the distributed storage cluster is operating with a last failure domain, an application write is considered complete only when acknowledgement is received that the application write is written to both the recovery server and the storage device associated with the last failure domain.

In another embodiment, the recovery server can also update a node that rejoins the distributed storage cluster with the latest copy of configuration data. As discussed above, configuration data 130 is data that is used by CVM for configuring the various nodes in the distributed storage cluster. In this example, if a new data group or a new volume is created by the nodes executing application 135, then such transactions related to shared data groups and changes related to volume manager 145 are stored on recover server 175. In this manner, when a failed node reboots and rejoins the distributed storage cluster, the node has access to the latest copy of configuration data from the recovery server.

FIGS. 3A, 3B, 3C, 3D, and 3E are tables that illustrate an example of the manner in which application data and configuration data is stored in the various storage devices of a FSS cluster and on the recovery server. FIG. 3A is a table that illustrates how configuration data is organized on a master node of a FSS cluster. Data stored on the various storage devices in a FSS cluster is categorized according to cluster ID 310, data group ID 320, and volume name 330, and is assigned a recovery flag 340. In this example, a recovery flag that is set indicates enablement of logging/copying of changed blocks of application data to the recovery server because the distributed storage cluster is operating with a last failure domain.

In one embodiment, and as illustrated by FIG. 3B, the latest copy of configuration data is copied from master node 105(1) to recovery server 175. Although the master node initially copies configuration data to the recovery server (e.g., even when the distributed storage cluster is not operating with the last failure domain or if there are more than one failure domains), if a determination is made that the distributed storage cluster is operating with the last failure domain, the master node replaces and/or updates the earlier stored copy of the configuration data stored on the recovery server with a latest copy of configuration data. As mentioned above, recovery flag 340 indicates whether recovery server 175 has the latest copy of configuration data 130. Recovery flag 340 can also indicate to a node rejoining the distributed storage cluster whether the rejoining node has the latest copy of configuration data 130. For example, if a failed node reboots and rejoins FSS cluster 100B, recovery flag 340 being set indicates to the node that the node has to use the latest copy of configuration data 130 from recovery server 175 (e.g., the rejoined node does not have the latest CVM configuration).

In another embodiment, after a node rejoins the distributed storage cluster and updates itself with the latest copy of configuration data 130, the node then checks recovery server 175 for changed blocks of application data 125. FIG. 3C illustrates changed blocks of application data 125 that have been generated due to new application writes from the time a node fails to the time the node rejoins FSS cluster 100B. For example, as illustrated in FIG. 3D, changed blocks B8, B10, B12, B21, B22, B25, and B30 are logged and written to recovery server 175. If and when a node rejoins FSS cluster 100B, the node can check recovery server 175 to determine changed blocks 250 of application data 125. Once changed blocks 250 of application data 125 are determined, then, as illustrated by FIG. 3E, the node can copy and replace changed blocks of 250 of application data 125 directly from recovery server 175. Therefore, a complete recovery can be achieved once the node has the latest copy of configuration data 130 and the up-to-date copy of application data 125.

In some embodiments, if other nodes remain offline after the recovery of a given node, then the recovered node can be designated as the master node. Because the recovered node is now healthy (e.g., the node has the latest copy of configuration data 130 and the up-to-date copy of application data 125), the configuration data and application data stored on the recovery server can be deleted and recovery flag 340 can be cleared, as any future copies of configuration data and application data will presumably contain new data to be re-copied and re-stored on the recovery server from the given node in the FSS cluster.

It will be appreciated that the data storage and recovery methodology described herein may make a FSS cluster resilient to handle failures, and at the same time may prevent data corruption because of the role of the recovery server. Therefore, complete data recovery may be achieved in storage virtualization environments involving multiple FSS clusters.

An Example Computing Environment

Figure 4:
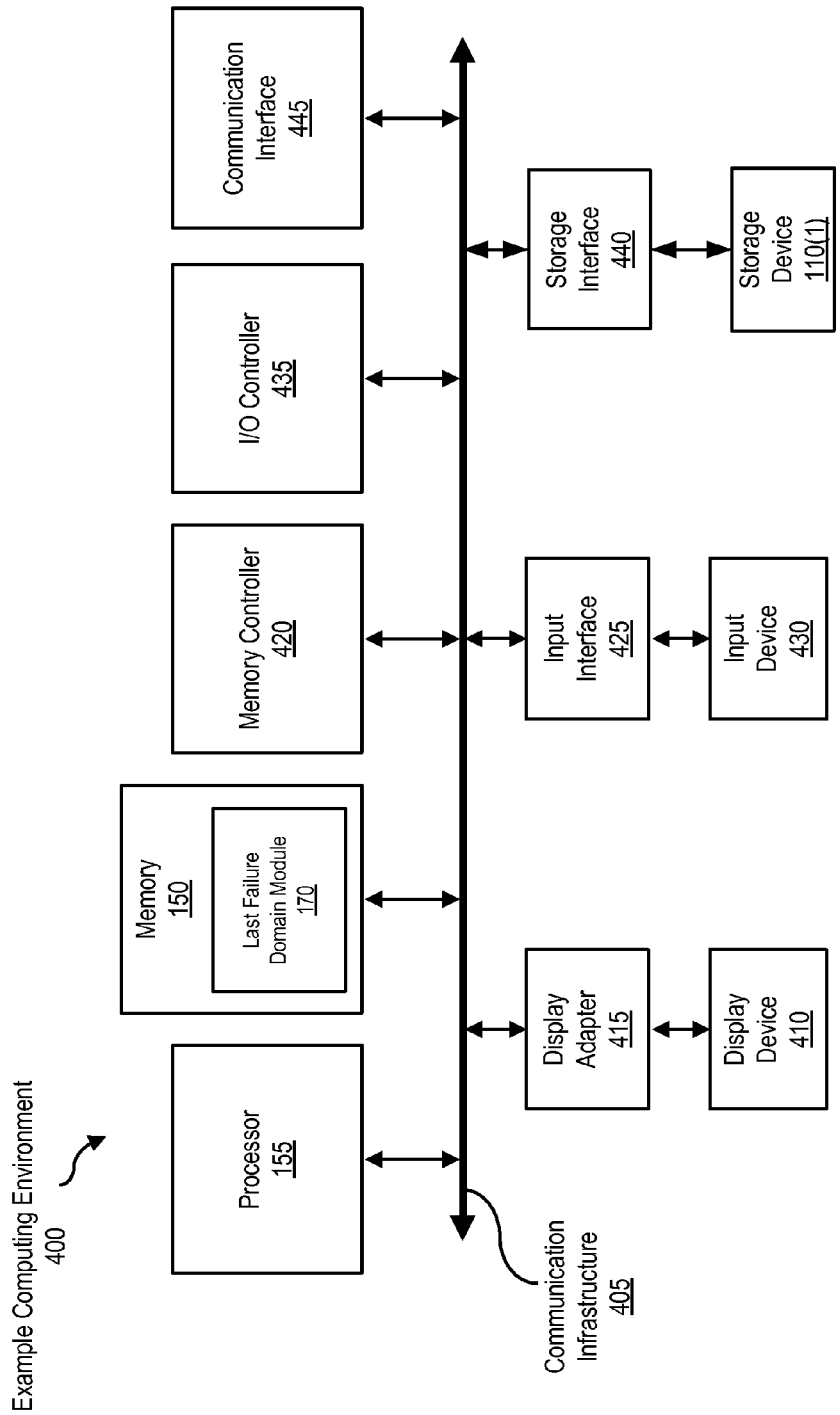
FIG. 4 is a block diagram of an example computing environment that implements data storage and recovery in distributed storage environments, according to one embodiment of the present invention.

FIG. 4 is a block diagram of a recovery server 175 and/or master node 105(1) capable of implementing data recovery in distributed SN storage environments as described above. Recovery server 175 and/or master node 105(1) broadly represent any single or multi-processor computing devices or systems capable of executing computer-readable instructions. Examples include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In their most basic configurations, recovery server 175 and/or master node 105(1) may include at least one processor 155 and a memory 150. For example, by executing the software that implements last failure domain module 170, recovery server 175 becomes a special purpose computing device that is configured to perform data recovery in a distributed SN storage environment.

Processor 155 generally represents any type or form of processing unit capable of processing data or interpreting and executing instructions. In certain embodiments, processor 155 may receive instructions from a software application or module. These instructions may cause processor 155 to perform the functions of one or more of the embodiments described and/or illustrated herein. For example, processor 155 may perform and/or be a means for performing all or some of the operations described herein. Processor 155 may also perform and/or be a means for performing any other operations, methods, or processes described and/or illustrated herein.

Memory 150 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments, recovery server 175 and master node 105(1) may both include both a volatile memory unit and a non-volatile storage device. In one example, program instructions implementing a data recovery operation may be loaded into memory 150.

In certain embodiments, recovery server 175 and/or master node 105(1) may also include one or more components or elements in addition to processor 155 and memory 150. For example, as illustrated in FIG. 4, recovery server 175 and/or master node 105(1) may include a memory controller 420, an Input/Output (I/O) controller 435, and a communication interface 445, each of which may be interconnected via a communication infrastructure 405. Communication infrastructure 405 generally represents any type or form of infrastructure capable of facilitating communication between one or more components of a computing device. Examples of communication infrastructure 405 include, without limitation, a communication bus (such as an Industry Standard Architecture (ISA), Peripheral Component Interconnect (PCI), PCI express (PCIe), or similar bus) and a network.

Memory controller 420 generally represents any type or form of device capable of handling memory or data or controlling communication between one or more components of computing system 400. For example, in certain embodiments memory controller 420 may control communication between processor 190, memory 185, and I/O controller 435 via communication infrastructure 405. In certain embodiments, memory controller 420 may perform and/or be a means for performing, either alone or in combination with other elements, one or more of the operations or features described and/or illustrated herein.

I/O controller 435 generally represents any type or form of module capable of coordinating and/or controlling the input and output functions of a computing device. For example, in certain embodiments I/O controller 435 may control or facilitate transfer of data between one or more elements of recovery server 175 and/or master node 105(1), such as processor 155, memory 150, communication interface 445, display adapter 415, input interface 425, and storage interface 440.

Communication interface 445 broadly represents any type or form of communication device or adapter capable of facilitating communication between recovery server 175, master node 105(1), and one or more additional devices. For example, in certain embodiments communication interface 445 may facilitate communication between recovery server 175 and/or master node 105(1) and a private or public network including additional computing systems. Examples of communication interface 445 include, without limitation, a wired network interface (such as a network interface card), a wireless network interface (such as a wireless network interface card), a modem, and any other suitable interface. In at least one embodiment, communication interface 445 may provide a direct connection to a remote server via a direct link to a network, such as the Internet. Communication interface 445 may also indirectly provide such a connection through, for example, a local area network (such as an Ethernet network), a personal area network, a telephone or cable network, a cellular telephone connection, a satellite data connection, or any other suitable connection.

In certain embodiments, communication interface 445 may also represent a host adapter configured to facilitate communication between primary node 120A and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 445 may also allow recovery server 175 and/or master node 105(1) to engage in distributed or remote computing. For example, communication interface 445 may receive instructions from a remote device or send instructions to a remote device for execution.

As illustrated in FIG. 4, recovery server 175 and/or master node 105(1) may also include at least one display device 410 coupled to communication infrastructure 405 via a display adapter 415. Display device 410 generally represents any type or form of device capable of visually displaying information forwarded by display adapter 415. Similarly, display adapter 415 generally represents any type or form of device configured to forward graphics, text, and other data from communication infrastructure 405 (or from a frame buffer, as known in the art) for display on display device 410.

As illustrated in FIG. 4, recovery server 175 and/or master node 105(1) may also include at least one input device 430 coupled to communication infrastructure 405 via an input interface 425. Input device 430 generally represents any type or form of input device capable of providing input, either computer or human generated, to computing system 400. Examples of input device 430 include, without limitation, a keyboard, a pointing device, a speech recognition device, or any other input device.

As illustrated in FIG. 4, master node 105(1) may also include a storage device 110(1). Storage device 110(1) generally represents any type or form of storage device or medium capable of storing data and/or other computer-readable instructions. For example, storage device 110(1) may include a magnetic disk drive (e.g., a so-called hard drive), a floppy disk drive, a magnetic tape drive, an optical disk drive, a flash drive, or the like. Storage interface 440 generally represents any type or form of interface or device for transferring and/or transmitting data between storage device 110(1) and other components of master node 105(1).

In certain embodiments, storage device 110(1) may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 110(1) may also include other similar structures or devices for allowing computer software, data, or other computer-readable instructions to be loaded into computing system 400. For example, storage device 110(1) may be configured to read and write software, data, or other computer-readable information. Storage device 110(1) may also be a part of master node 105(1) or may be a separate device accessed through other interface systems.

Many other devices or subsystems may be connected to the computing system illustrated in FIG. 4. Conversely, all of the components and devices illustrated in FIG. 4 need not be present to practice the embodiments described and/or illustrated herein. The devices and subsystems referenced above may also be interconnected in different ways from that shown in FIG. 4.

Recovery server 175 and/or master node 105(1) may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to the computing system illustrated in FIG. 4 for storage in memory via a network such as the Internet or upon a carrier medium.

The computer-readable medium containing the computer program may be loaded into the computing system illustrated in FIG. 4. All or a portion of the computer program stored on the computer-readable medium may then be stored in memory 150 and/or various portions of storage devices 110(1), 110(2), and/or 110(3). When executed by processor 155, a computer program loaded into recovery server 175 and/or master node 105(1) may cause processor 155 to perform and/or be a means for performing the functions of one or more of the embodiments described and/or illustrated herein. Additionally or alternatively, one or more of the embodiments described and/or illustrated herein may be implemented in firmware and/or hardware. For example, recovery server 175 and/or master node 105(1) may be configured as an application specific integrated circuit (ASIC) adapted to implement one or more of the embodiments disclosed herein.

An Example Networking Environment

Figure 5:
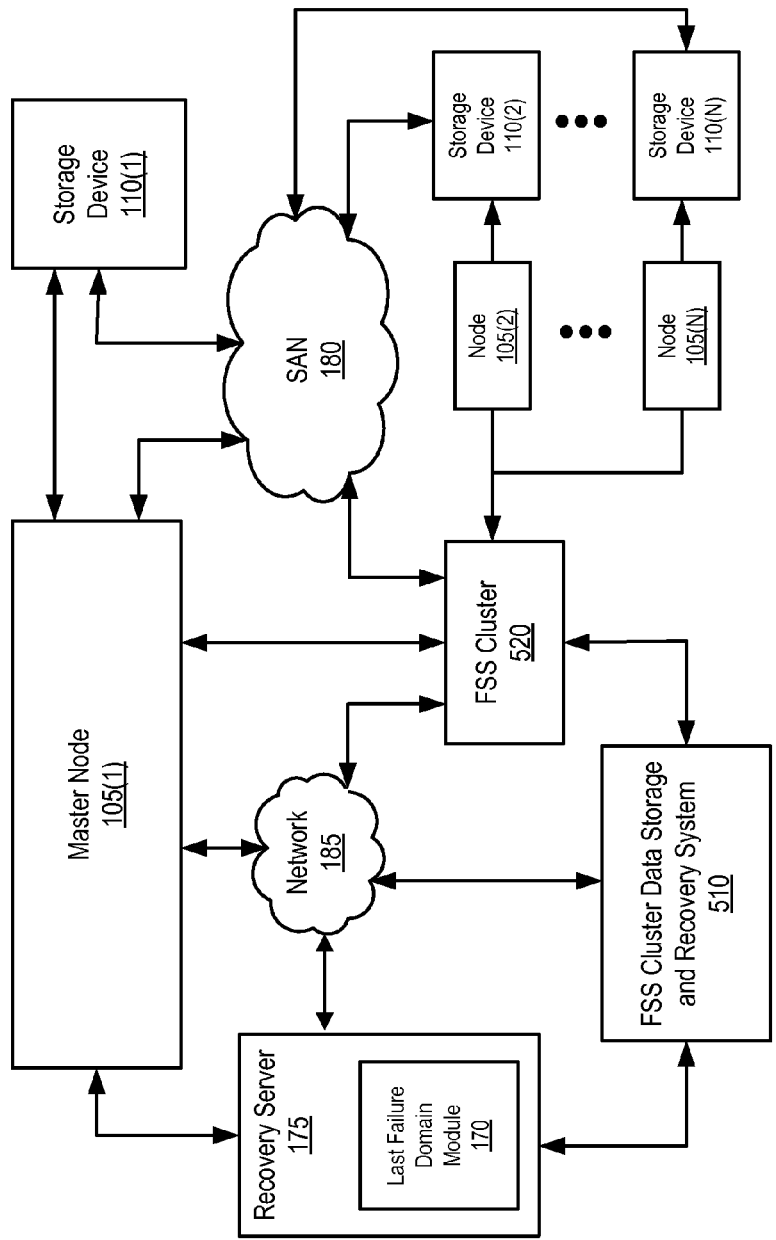
FIG. 5 if a block diagram of an example networking environment that implements data storage and recovery in distributed storage environments, according to one embodiment of the present invention.

FIG. 5 is a block diagram of a network architecture in which recovery server 175 and master node 105(1) may be coupled to network 185. As illustrated in FIG. 5, master node 105(1) may be attached to recovery server 175 through network 185. In certain embodiments, network-attached storage (NAS) devices may be configured to communicate with storage devices 110(1) and 110(2) using various protocols, such as Network File System (NFS), Server Message Block (SMB), or Common Internet File System (CIFS).

Master node 105(1), and nodes 105(2) and 105(3) may also be connected to a network 185. Network 185 generally represents any type or form of computer network or architecture capable of facilitating communication between multiple computing devices. Network 185 may facilitate communication between master node 105(1), and nodes 105(2) and 105(3), and recovery server 175. In certain embodiments, and with reference to master node 105(1), a communication interface, such as communication interface 445 in FIG. 4, may be used to provide connectivity between storage device 110(1) and network 185. It should be noted that the embodiments described and/or illustrated herein are not limited to the Internet or any particular network-based environment.

In at least one embodiment, all or a portion of one or more of the embodiments disclosed herein may be encoded as a computer program and loaded onto and executed by nodes master node 105(1), nodes 105(2)-105(N), storage device 110(1), storage devices 110(2)-110(N), or any combination thereof. All or a portion of one or more of the embodiments disclosed herein may also be encoded as a computer program, stored in master node 105(1), and/or nodes 105(2)-105(N), and distributed over network 185.

In some examples, all or a portion of the nodes in FIGS. 1A and 1B may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a last failure domain module may transform behavior of a recovery server in order to cause the recovery server and a last failure domain to communicate with a storage device and/or another node.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining whether a distributed storage cluster is operating with a last failure domain, wherein
        the last failure domain is an only node of a plurality of nodes with access to a latest copy of configuration data and an up-to-date copy of application data; and
    in response to a determination that the distributed storage cluster is operating with the last failure domain,
        causing the last failure domain to copy one or more changed blocks of the up-to-date copy of the application data from one or more mirrored volumes to a recovery server for storage, wherein
            the one or more mirrored volumes are stored at a storage device associated with the last failure domain.

2. The method of claim 1, comprising
    causing a master node to copy the latest copy of the configuration data to the recovery server, wherein the latest copy of the configuration data is for the plurality of nodes.

3. The method of claim 2, comprising:
performing a restore operation, wherein
the restore operation is performed using the latest copy of the configuration data and the one or more changed blocks of the up-to-date copy of application data stored at the recovery server, and
the restore operation is performed on one or more nodes of the plurality of nodes after the one or more nodes rejoin the distributed storage cluster.

4. The method of claim 3, comprising:
deleting the latest copy of the configuration data and the one or more changed blocks of the up-to-date copy of application data from the recovery server after performing the restore operation.

5. The method of claim 3, wherein
the determination of whether the distributed storage cluster is operating under the last failure domain comprises
determining whether all nodes of the plurality of nodes other than the last failure domain have failed,
determining whether the storage device coupled to each node of the plurality nodes has failed, and
determining whether the one or more nodes that rejoin the distributed storage cluster are performing a synchronization operation.

6. The method of claim 3, wherein
the distributed storage cluster maintains a failure count ID that indicates whether the restore operation should be performed from the recovery server or whether the master node comprises the latest copy of the configuration data and the up-to-date copy of the application data.

7. The method of claim 2, wherein
the storage device associated with the master node of the plurality of nodes comprises the up-to-date copy of the application data, and
the master node and the storage device associated with the master node comprise the latest copy of the configuration data, wherein
the master node is the last failure domain,
the master node comprises one part of the latest copy of the configuration data, and
the storage device associated with the master node comprises an another part of the latest copy of the configuration data.

8. The method of claim 1, comprising
determining whether the plurality of nodes are part of the distributed storage cluster.

9. The method of claim 1, wherein
the copying continues until the distributed storage cluster has more than one failure domain.

10. The method of claim 1, wherein
each node of the plurality of nodes is coupled to a corresponding of a plurality of storage devices,
one of more of the corresponding of the plurality of storage devices comprise the one or more mirrored volumes, and
the plurality of nodes execute an application that generates the application data.

11. A non-transitory computer readable storage medium storing program instructions executable to:
determine whether a distributed storage cluster is operating with a last failure domain,
wherein
the last failure domain is an only node of a plurality of nodes with access to a latest copy of configuration data and an up-to-date copy of application data; and
in response to a determination that the distributed storage cluster is operating with the last failure domain,
cause the last failure domain to copy one or more changed blocks of the up-to-date copy of the application data from one or more mirrored volumes to a recovery server for storage, wherein
the one or more mirrored volumes are stored at a storage device associated with the last failure domain.

12. The non-transitory computer readable storage medium of claim 11, comprising:
causing a master node to copy the latest copy of the configuration data to the recovery server, wherein
the latest copy of the configuration data is for the plurality of nodes; and
determining whether the plurality of nodes are part of the distributed storage cluster.

13. The non-transitory computer readable storage medium of claim 12, comprising:
performing a restore operation, wherein
the restore operation is performed using the latest copy of the configuration data and the changed blocks of application data stored at the recovery server, and
the restore operation is performed on one or more nodes of the plurality of nodes after the one or more nodes rejoin the distributed storage cluster.

14. The non-transitory computer readable storage medium of claim 13, wherein
the determination of whether the distributed storage cluster is operating under the last failure domain comprises
determining whether all nodes of the plurality of nodes other than the last failure domain have failed,
determining whether the storage device coupled to each node of the plurality nodes has failed, and
determining whether the one or more nodes that rejoin the distributed storage cluster are performing a synchronization operation.

15. A system comprising:
one or more processors; and
a memory coupled to the one or more processors, wherein the memory stores program, instructions executable by the one or more processors to:
determine whether a distributed storage cluster is operating with a last failure domain,
wherein
the last failure domain is an only node of a plurality of nodes with access to a latest copy of configuration data and an up-to-date copy of application data; and
in response to a determination that the distributed storage cluster is operating with the last failure domain,
cause the last failure domain to copy one or more changed blocks of the up-to-date copy of the application data from one or more mirrored volumes to a recovery server for storage, wherein
the one or more mirrored volumes are stored at a storage device associated with the last failure domain.

16. The system of claim 15, comprising:
performing a restore operation, wherein
the restore operation is performed using the latest copy of the configuration data and the one or more changed blocks of the up-to-date copy of application data stored at the recovery server, and the restore operation is performed on one or more nodes of the plurality of nodes after the one or more nodes rejoin the distributed storage cluster; and deleting the latest copy of the configuration data and the one or more changed blocks of the up-to-date copy of application data from the recovery server after performing the restore operation.

17. The system of claim 15, comprising:

causing a master node to copy the latest copy of the configuration data to the recovery server, wherein the latest copy of the configuration data is for the plurality of nodes.

18. The system of claim 17, wherein the storage device associated with the master node of the plurality of nodes comprises the up-to-date copy of the application data, and the master node and the storage device associated with the master node comprise the latest copy of the configuration data, wherein the master node is the last failure domain, the master node comprises one part of the latest copy of the configuration data, and the storage device associated with the master node comprises an another part of the latest copy of the configuration data.

19. The system of claim 17, wherein the distributed storage cluster maintains a failure count ID that indicates whether the restore operation should be performed from the recovery server or whether the master node comprises the latest copy of the configuration data and the up-to-date copy of the application data.

20. The system of claim 15, wherein each node of the plurality of nodes is coupled to a corresponding of a plurality of -storage devices, one of more of the corresponding of the plurality of storage devices comprise the one or more mirrored volumes, and the plurality of nodes execute an application that generates the application data.

* * * * *